United States Patent [19]
Meyer et al.

[11] Patent Number: 5,211,352
[45] Date of Patent: May 18, 1993

[54] DUAL SPRING TENSION REDUCER

[75] Inventors: Christopher D. Meyer, Sterling Hgts.; David E. Righter, Birmingham; John G. MaCalla, New Baltimore; Robert C. Pfeiffer, Troy, all of Mich.

[73] Assignee: AlliedSignal Inc.

[21] Appl. No.: 810,239

[22] Filed: Dec. 19, 1991

Related U.S. Application Data

[63] Continuation-in-part of Ser. No. 619,627, Nov. 28, 1990, abandoned.

[51] Int. Cl.$^5$ .............................................. B60R 22/44
[52] U.S. Cl. .................................... 242/107; 280/807; 280/808
[58] Field of Search ......... 242/107, 107.4 A, 107.4 B, 242/107.7; 280/806, 807, 808

[56] References Cited

U.S. PATENT DOCUMENTS

| | | | |
|---|---|---|---|
| 4,113,200 | 9/1978 | Tanaka | 242/107 |
| 4,165,844 | 8/1979 | Tanaka | 242/107 |
| 4,345,723 | 8/1982 | Morinaga | 242/107 |
| 4,346,858 | 8/1982 | Hollowell | 242/107 |
| 4,385,737 | 5/1983 | Gulette et al. | 242/107.7 |
| 4,509,706 | 4/1985 | Thomas | 242/107 |

*Primary Examiner*—John M. Jillions
*Attorney, Agent, or Firm*—Markell Seitzman

[57] ABSTRACT

A dual tension safety belt retracting device comprising: a frame (10), a spool (70b) rotatably mounted on the frame, for storing safety belt webbing (84). The device including first and second ratchet wheels (74b, 76b) and an outer tube (112), extending into and connecting the first and second ratchet wheels. An inner shaft (130) extends through and is rotatably disposed in the outer tube (112); a main, high torque (140) rewind spring is provided to apply a rewind bias to the inner shaft (130). A low torque, rewind spring (158) connects the outer tube (112) to a control ratchet wheel (154); a cap (170 interconnects the control ratchet wheel (154) to the inner shaft (130). A control pawl (200) for engaging the control ratchet wheel (154), is rotatably mounted relative to the frame (26), and movable between a first position disengaged from the control ratchet wheel (154) and a second position in engagement with the control ratchet wheel (154) wherein when the control pawl is in its second position it is effective to block out the main rewind spring from exerting a bias on the safety belt webbing. The control pawl (200) being move between the first and second position under control of selected mechanisms.

11 Claims, 7 Drawing Sheets

DUAL SPRING TENSION REDUCER

This application is a continuation in part of application Ser. No. 07/619,627, filed on Nov. 28, 1990, now abandoned.

BACKGROUND AND SUMMARY OF THE INVENTION

The present invention relates to a retraction mechanism for an emergency locking seat belt retractor and more specifically to a mechanism capable of selectively applying one of two different magnitudes of spool rewind bias force to the safety belt retractor spool.

Various types of dual tension safety belt retractor mechanisms have been employed and are shown in the prior art for selectively applying a main spring rewind bias to the safety belt spool during normal belt extraction and retraction relative to the retractor and for applying a lower tension to the belt while the safety belt is in use about the vehicle occupant.

Exemplary of prior art, dual tension retraction mechanisms are those disclosed in U.S. Pat. No. 4,165,844 which utilizes a main rewind spring which is blocked out or locked to the retractor housing when the belt is in its low tension mode. The unlocking or locking of the main spring for power retraction of the belt is accomplished by a partial rewinding of the belt reel under the low tension bias. U.S. Pat. No. 4,346,858 provides another dual tension safety belt retractor which does not require the partial rewinding of the belt reel. In this mechanism a pawl is mounted to a pawl carrier which upon coupling to a coacting ratchet wheel blocks out the force of the main rewind spring. This patent also includes means for unlocking the power rewind spring while the pawl is engaged with the ratchet and is accomplished by a release arm which disengages the pawl. The release arm is moved by an activation mechanism such as a manual switch, solenoid or air/vacuum pressure valves.

It is an object of the present invention to provide a retractor having a dual tension mode of operation.

Accordingly, the invention comprises a dual tension safety belt retracting device comprising: a frame, a spool rotatably mounted on the frame, for storing safety belt webbing. The device including first and second ratchet wheels and an outer tube, extending through and connecting the first and second ratchet wheels, wherein an end of the outer tube extends beyond the first ratchet wheel. An inner shaft extends through and is rotatably disposed in the outer tube; a main, high torque rewind spring is provided to apply a rewind bias to the inner shaft. A low torque, rewind spring connects the outer tube to a control ratchet wheel; a cap interconnects the control ratchet wheel to the inner shaft. A control pawl means for engaging the control ratchet wheel, is rotatably mounted relative to the frame, and movable between a first position disengaged from the control ratchet wheel and a second position in engagement with the control ratchet wheel wherein when the control pawl means is in its second position, it is effective to block out the main rewind spring from exerting a bias on the safety belt webbing. The device further includes means for causing the control pawl means to move between the first and second position. In one embodiment of the invention such means includes a follower movable in response to the amount of webbing rewound on a designated spool. In other embodiments a solenoid and cable are used. In the preferred embodiment of the invention a second spool is also mounted to the frame and webbing engaging means such as the follower extends to and senses the amount of webbing on the second retractor thereby moving the webbing engaging means and hence moving the control pawl means between the first and second positions.

Many other objects and purposes of the invention will be clear from the following detailed description of the drawings.

DETAILED DESCRIPTION OF THE DRAWINGS

Figure 1:
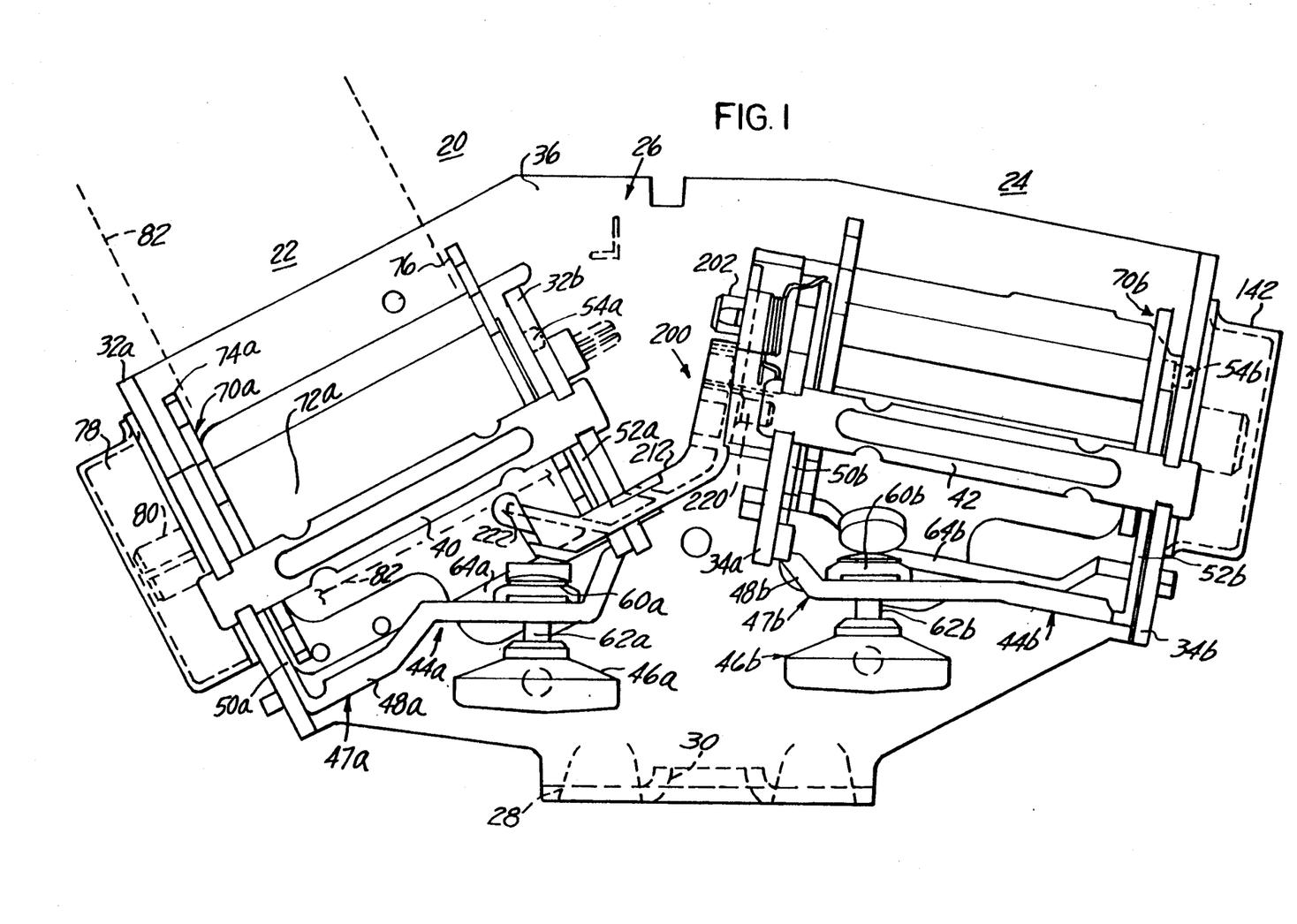
FIG. 1 illustrates a front plan view of a dual spool seat belt retraction mechanism incorporating features of the present invention.

A first embodiment of the invention is described with reference to FIGS. 1–7. With reference to FIG. 1, there is shown a seat belt retraction mechanism 20 comprising a lap belt retractor 22 and a shoulder belt retractor 24. Both of the retractors 22 and 24 are supported by a frame 26, having a perpendicularly extending base portion 28 (which extends into the plane of the paper). The base may include an opening such as 30 enabling the frame 26 to be attached to a cooperating portion of the vehicle structure. The frame includes two pairs of extending walls 32a,b and 34a,b which define side supports for each respective retractor 22 and 24. As can be seen from FIG. 1, the walls 32a,b and 34a,b form in cooperation with the main portion 36 of the frame 26 a plurality of U-shaped retractor frames. Extending across the front portion of walls 32a,b is a reinforcement bar 40. Similarly, extending across and connecting walls 34a,b is another reinforcement bar 42.

Each retractor 22 and 24 includes an inertia responsive mechanism or assembly generally shown as 44a (for retractor 22) and 44b (for retractor 24). This type of assembly is known in the art. The inertia responsive mechanism employed in retractor 22 is shown and described with subscripts a. A similar structure is used for retractor 24 and shown and described with a subscript b. With regard to the inertial responsive assembly 44a, such assembly includes a pendulum 46a which is supported by a U-shaped, preferably plastic support member 47a which includes a lower cross member 48a. As can be seen, the shape of the respective cross member 48b used in retractor 24 is slightly different. The shapes of these cross members are such that the rest position of the pendulum 46a (46b) is substantially vertical.

The support member 47a is secured to the frame walls (32a,b) using integrally formed legs 50a and 52a which extend upwardly from the cross member 48a. These legs or side portions 50a and 52a (and 50b and 52b in retractor 24) include a plurality of openings through which various shaft members (as further described below) extend. These side members or legs 50a and 52a are further secured to the sides 32a,b of the frame by integrally formed bosses or projections such as 54a (see FIG. 1) which extend through complementary shaped openings in the respective side portions 32a,b of the frame. The side members or legs also include an extending, hollow circular portion such as 56a and 58a which are more clearly shown in FIG. 2 and which serve as bushings to support a shaft such as 72a. The assembly 44a further includes an activating element 60a formed as a button which is connected to the pendulum 46a by a shaft 62a. In response to a severe level of vehicle deceleration, the pendulum 46a pivots relative to the cross member 48a to lift a lock dog 64a into contact with teeth formed on the spool (as shown below).

Figure 2:
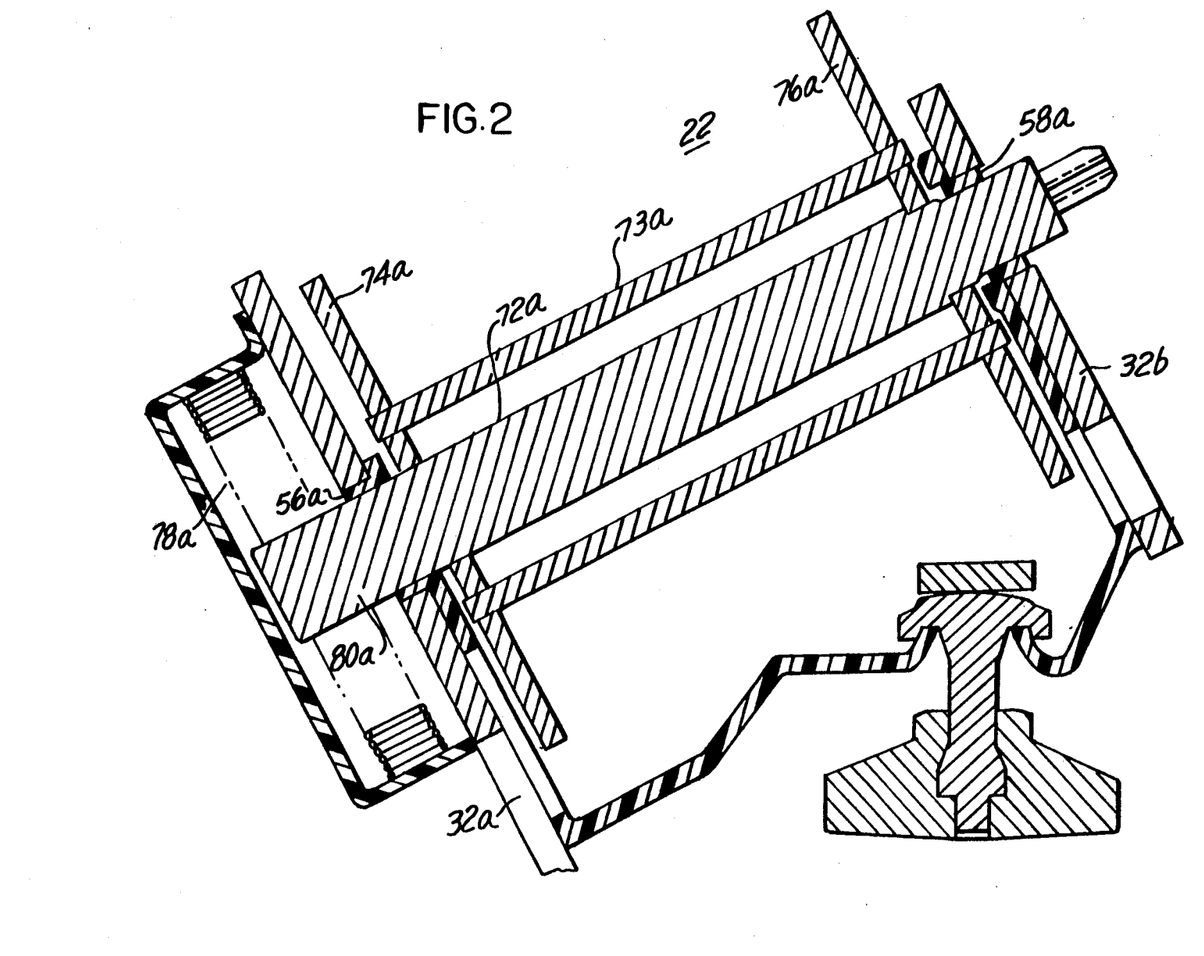
FIG. 2 illustrates an isolated cross-sectional view of one of the retractors shown in FIG. 1.

The retractor 22 further includes a spool generally shown as 70a comprising the shaft 72a. The spool 70a further includes a winding tube 73a through which is received an end portion of the lap belt in a known manner as shown in FIG. 2. Attached to the shaft 72a are ratchet wheels 74a and 76a. The lock dog 64a moves into contact with teeth on these ratchet wheels 74a and 76a in a known manner during high vehicle decelerations. A rewind spring 78a is connected to one end 80a of the spool 72a to provide a reverse bias for the lap belt webbing 82 (shown in phantom line in FIG. 1).

Figure 3:
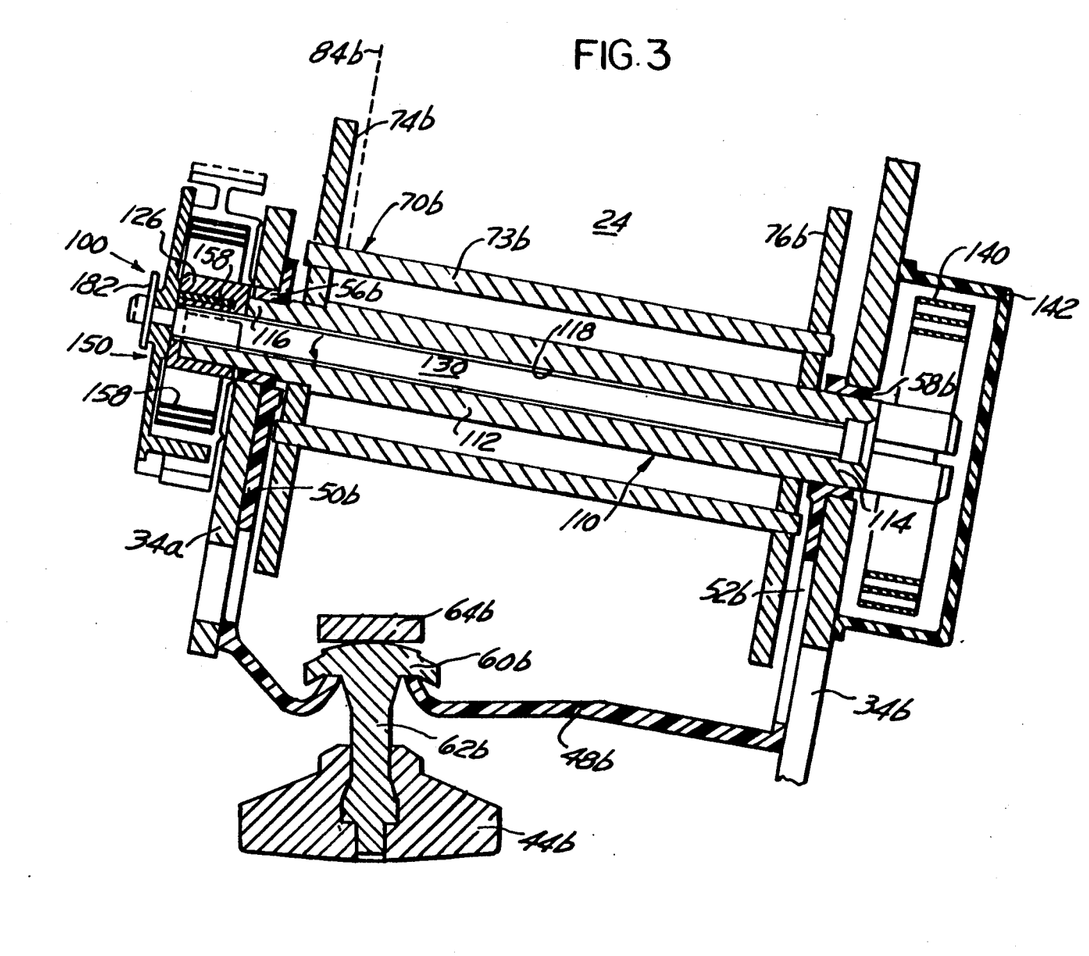
FIG. 3 is a cross-sectional view showing in isolation the second retractor shown in FIG. 1.

Reference is made to FIGS. 3 and 1. As can be seen from the description above, and more specifically the depiction in FIG. 3, the construction of retractor 24 shares many common constructional features to that of retractor 22, the difference being in the construction of portions of the spool 70b as well as the inclusion within retractor 24 of a dual tension spring mechanism generally shown as 100. With regard to the spool 70b (for retractor 24), such spool 70b includes right and left side ratchet wheels 74b and 76b having teeth thereon which interact with the associated lock dog or bar 64b. It should be noted that in FIG. 3 only a circular extension of the lock bar is shown in engagement with the cap 60b of the inertial responsive assembly 44b. The spool 70b includes a winding tube 73b which receives an end of a shoulder belt shown in phantom line as 84, and which in its retracted position is wound about the periphery of the winding tube 73b.

The spool 70b includes a composite shaft generally shown as 110. The shaft 110 includes an outer shaft or tube 112 connected to the ratchet wheels 74b and 76b. The outer shaft extends beyond the ratchet wheels. The right side 114 of the outer shaft 112 is supported by the extending portion 58b of the side or leg 52b, which is part of the support member 47b and inertial responsive assembly 44b. The left hand portion 116 is similarly supported on the bushing formed by the extending portion 56b. The outer shaft or tube 112 includes a central bore 118.

Figure 4:
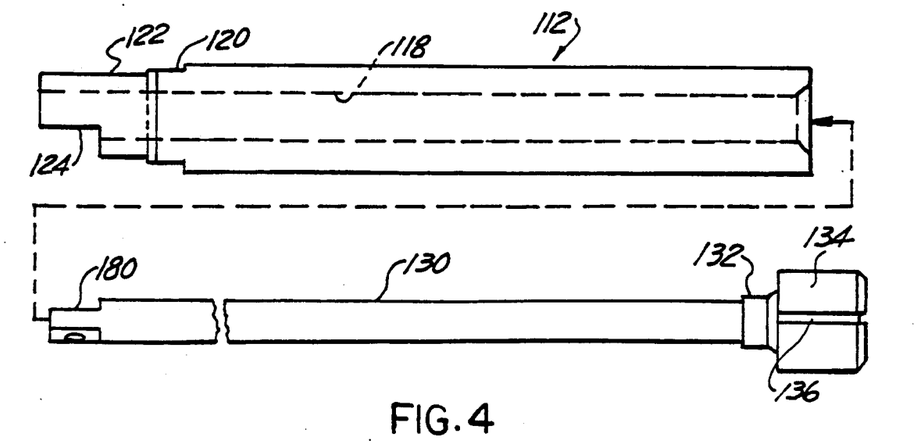
FIG. 4 illustrates portions of the second retractor.
Figure 5:
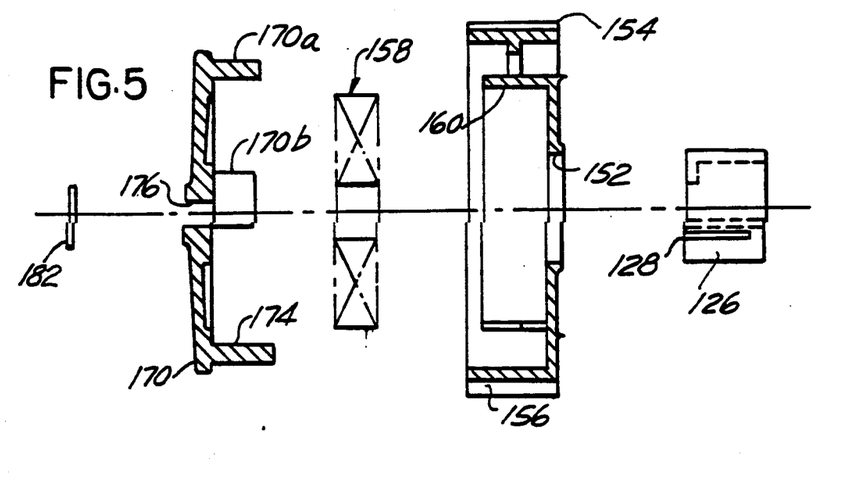
FIG. 5 illustrates portions of a dual tension rewind mechanism.

FIG. 4 illustrates an exploded view of the outer shaft 112. The shaft 112 includes a first keyway 120 upon which is journaled the ratchet wheel 74b. The shaft 112 further includes a narrowed portion 122 the end of which is formed as a second keyway 124 onto which is received a post or arbor 126 (shown in FIG. 5), which includes a slot 128 for receipt of one end of a low tension rewind spring (as discussed below).

The shaft 110 includes an inner shaft 130 (also shown in FIG. 4) which extends through the bore 118 of the outer shaft 112. Near the right hand end of the shaft 130 is a slightly enlarged diameter portion 132 which serves to stabilize the shaft 130 within the outer shaft or tube 112. One end of the shaft 130 is formed with a spring retaining mechanism 134 having a slot 136 therein for securing one end of a high tension or main rewind spring generally shown as 140 (in FIG. 3) which is protected by a cap 142.

Figure 6:
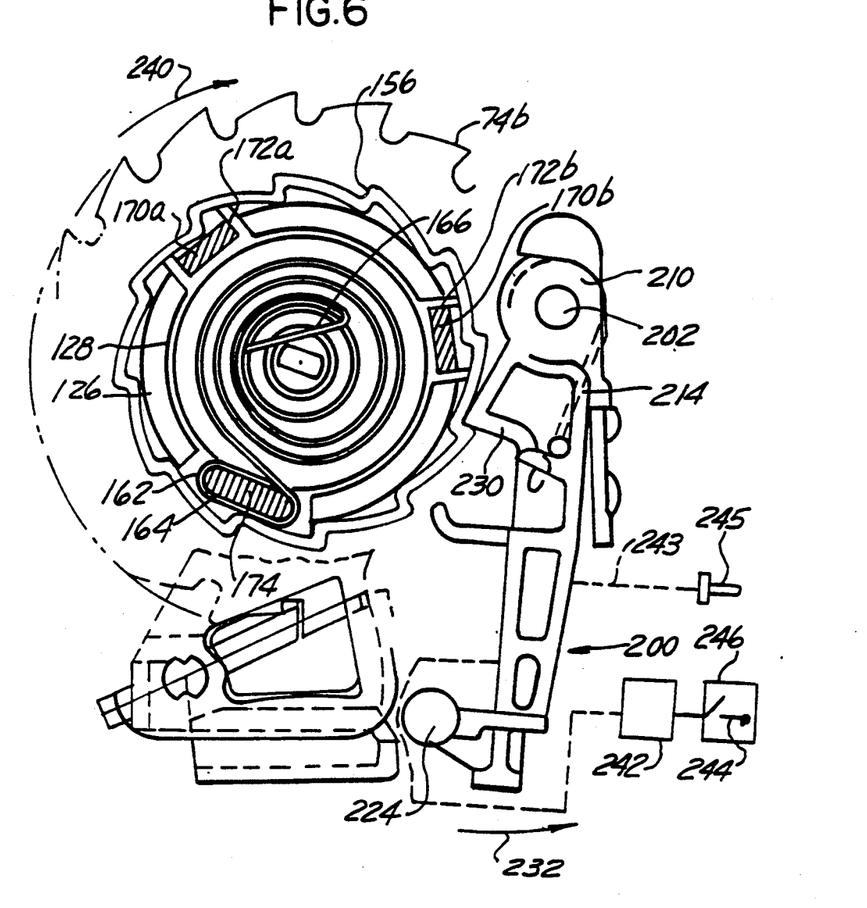
FIG. 6 shows a side plan view of the second retractor.

A tension spring reducer assembly 150 (see the left hand portion of FIG. 3 as well as FIG. 5), which is also part of the dual tension spring mechanism 100, is used to interconnect the tube 112 with the shaft 130. The tension spring reducer assembly comprises the above-mentioned post or arbor 126 which is received within an opening 152 of a ratchet wheel 154 which has teeth 156 about its periphery, a low tension rewind spring 158, which is received within a circular portion or cavity 160 of the ratchet wheel 154. The ratchet wheel as also shown in FIG. 6 includes a spring cavity 162 into which is received a bent portion 164 formed on one end of the spring 158. The inner end of the spring generally shown as 166 is received within the slot 128 of the post 126. The spring 158 is secured to the ratchet wheel 154 by a cap 170 (preferably metal) which includes a plurality of extending legs 170a and b, which tightly fit within recesses 172a and b formed within the ratchet wheel 154. The cap 170 includes an additional leg 174 which is received within the spring cavity 162 to secure the end 164 of the spring therein. The cap 170 further includes a narrow opening 176 through which extends the keyed end 180 of the inner shaft 130. The shaft 130 is secured to the cap by a lock washer 182 as shown in FIG. 3.

Reference is again made to FIG. 1 and more specifically to the left hand portion of retractor 24. There is shown a pawl mechanism 200 interconnecting retractor 24 and retractor 22. This pawl mechanism 200 is shown in FIG. 6 as well as in FIG. 7. The pawl mechanism 200 is supported on the left hand side frame 34a. More specifically, the attachment of the pawl assembly 200 to the frame side 34a is accomplished as follows. The side 50b which extends along the right hand wall of the frame side 34 is formed with an extending shaft portion 202, which extends laterally beyond the frame side 34a.

Figures 7, 8:
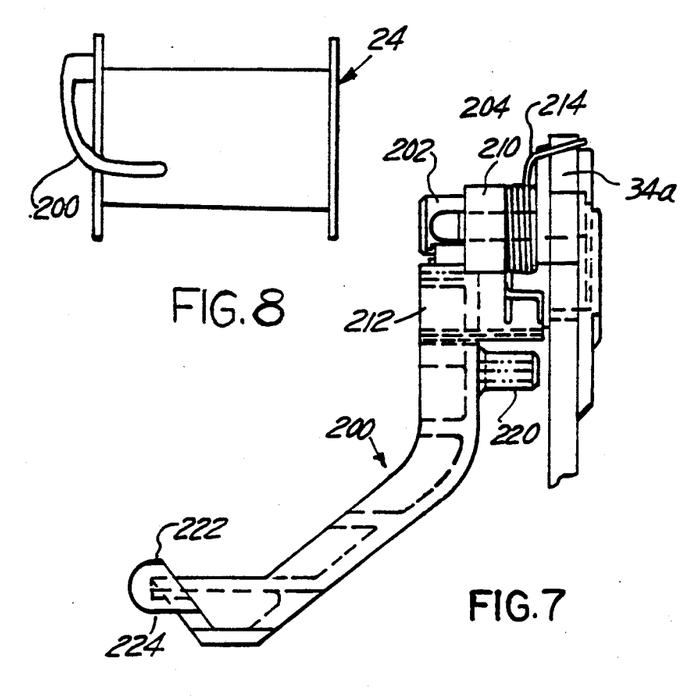
FIG. 7 shows a pawl mechanism.
FIG. 8 shows an alternate embodiment of the invention.

In practice, the integrally shaped support member 47b (cross member 48b and its sides or legs 50b and 52b) may be formed of plastic, and as such the extending shaft 202 is similarly of plastic construction. The shaft 202 may be bifurcated or split and widened at its end 204. The pawl assembly 200 includes a first tubular portion 210 which is received about the shaft 202 and retained thereupon by the portion 204. The pawl assembly 200 includes an activation arm or bar 212 which as shown in FIGS. 1 and 7 is arcuately (bent) shaped. The bar 212 is biased inwardly by a spring 214. The arm 212 at its end 222 is formed with a follower mechanism 224 having a spherical shape. By biased inwardly it is meant that in the context of the present invention the spring 214 will tend to move the pawl assembly 200 toward the spool 70a of retractor 22. More specifically in the context of the retracting mechanism shown in FIG. 1, the motion of the arm 212 in response to the bias force of spring 214, is into or out of the plane of the paper. A tab 220 extends from the arm 212 to engage an end of the reinforcement bar 42. If only one retractor, such as 24, is used as in a conventional 3-point seat belt system the arm 212 would be bent inwardly, as an example, to sense the amount of belt webbing of the sole retractor 24 as diagramatically illustrated in FIG. 8.

As can be seen from FIG. 1, and in view of the description above, the spring 214 biases the follower 224 against the lap webbing 82 wound about the tube 73a of retractor 22. This retractor 22 is shown in its occupant securing position, that is, where a significant quantity of the lap belt 82 has been wound off from the spool winding tube 73a. In the belt storing condition of retractor 22, that is when the rewind spring 78 rewinds the lap belt 82, additional turns of the lap belt webbing 82 will be wound about the winding tube 73a thereby pushing the follower mechanism 224 a greater distance from the center of the shaft 70a (this position is not shown in FIG. 1). In the rewind condition of retractor 22, the follower mechanism 224 as well as the entire pawl assembly 200 is moved outwardly relative to the center of shaft 70a and rotates about the shaft 202 (formed in retractor 24). In this condition the tab 220 may lightly engage the cross bar 42. With the pawl assembly 200 rotated in the above-described position, a locking pawl 230 formed thereon is moved away from the teeth 156 on the ratchet wheel 154 in the direction of arrow 232 (in FIG. 6). In its rewind or stored condition, the high tension rewind spring 140 of retractor 24 has rewound the shoulder belt 84 about the tube 73b of shaft 70b.

As the lap belt 82 is extended from the frame to its occupant securing position or in the case of using a single retractor 24 as its webbing is extended, fewer turns of the belt will remain wound about the winding tube 73a and as such, as the lap belt 82 is extended the follower mechanism 224 and arm 212 rotate inwardly toward the center of shaft 72a. This rotation is also reflected in a rotation about the shaft 202 such that after a given amount of the lap belt 82 has been extended, the arm 212, in view of the bias force exerted by spring 214, will reside in the condition shown in FIG. 6 wherein the locking pawl 230 is in engagement with a tooth 156 of the ratchet wheel 154. As the spool 70b of retractor 24 is rotated due to the extraction of the shoulder belt 84, it will rotate in a direction shown by arrow 240 (see FIG. 6) whereupon the locking pawl 230 will slip or ratchet over the teeth 156. In addition, as the shoulder belt 84 is extended the tube 73b as well as the ratchet wheels 74b and 76b rotate with the extending shoulder belt webbing 84. The motion of the ratchet wheels 74b and 76b is imparted to the outer shaft (or tube) 112. The tension reducer (low torque) spring 158 which is connected to the outer shaft 112 by the post or arbor 126 will start to wind up before the high tension spring 140. When the tension reducer spring 158 has wound to a certain torque (typically in response to for example four, five or six rotations of the spool 70b), the ratchet 154 will begin to turn since one end of the spring 158 is connected to the ratchet 154. As mentioned above and as can be seen in FIGS. 5 and 6, the ratchet 154 is connected to the inner shaft 130 through the cap 170 and key 180. Thereafter as the ratchet 154 turns, the shaft 130 will begin to turn and wind the main (high tension) spring 140. During continued extraction of the shoulder belt webbing 84, such as when it is being buckled by the occupant, the ratchet wheel 154 will slip or ratchet on the locking pawl 230 as the spool 70b and ratchet 154 move in the direction of arrow 240 (see FIG. 6).

The main rewind spring 140 will continue to be wound as the shoulder belt webbing is extracted as the occupant buckles the shoulder belt about his body. As is typically the case, slightly more webbing than is needed to secure the occupant is extracted from the retractor 24 during the buckle-up operation. Upon securing a tongue (not shown) associated with the shoulder belt webbing 84 to its cooperating buckle (not shown), the high tension rewind spring will initially attempt to reverse wind the inner shaft 130. The reverse bias imparted to the shaft 130 is communicated through the cap 170 and then to the ratchet wheel 154 causing same to attempt to move in a reverse direction. When this occurs the ratchet wheel and its cooperating locking pawl 230 achieve the orientation shown in FIG. 6, wherein the locking pawl 230 engages one of the teeth 156 on the ratchet wheel 154. As such, it can be seen that the ratchet wheel 154 has been temporarily fixed in place by the locking pawl 230. When the ratchet 154 becomes locked, further rewinding of the shoulder belt webbing 84 is accomplished under the action of the lower torque, tension reducer spring 158. With the ratchet wheel 154 locked, the tension or force which will be felt by the occupant on his shoulder is now just the result of the low torque, tension reducer spring 158, that is to say, the torque generated by the main spring 140 is blocked out.

With the shoulder belt webbing 84 in place, if the occupant leans forward slightly the force imparted to the shoulder is only due to the tension reducer spring 158. If, however, the occupant moves a significant distance forward such as to obtain an article from the glove compartment, the shoulder belt will be extended sufficiently that the tension reducer spring 158 will once again wind tightly to create a hard link between the ratchet wheel 154 and the inner shaft 130. As this larger amount of webbing is extended from the retractor, and after the tension reducer spring 158 has wound sufficiently, the ratchet wheel 154 will once again slide on the locking pawl 230 as the spool rotates in the direction of arrow 240. In this situation the occupant will feel the tension of the high torque rewind spring 140. When the occupant again resumes an upright position, the webbing will be rewound by action of the tension reducer spring since, in this situation, the ratchet 154 will once again be locked to the locking pawl 230 and lock-out the high tension spring return force.

When the lap belt webbing is retracted, that is, as significant number of turns of the lap belt webbing is rewound upon the tube 73a, the follower mechanism 224 will be moved further away from the center of the shaft 72a, thereby disengaging the locking pawl 230 from the teeth 156 of the ratchet 154. Thereafter, the shoulder belt webbing will be rewound by the stored energy in the main rewind spring 140, thereby causing the shoulder belt webbing 84 to retract quickly.

As can be seen from the above, the pawl assembly 200 is moved by the interaction of the follower mechanism 224 against the webbing under the action of spring 214. FIG. 6 also illustrates an alternate embodiment of the invention. To achieve this embodiment, the follower mechanism 224 would be eliminated and the pawl assembly 200 is moved to the disengage position under the action of a solenoid generally shown as 242 which pushes the assembly in the direction of arrow 232. The solenoid may be activated by a switch 244 contained in a seat belt buckle 246 as often utilized in the art. The solenoid 242 can be deactivated thereby permitting the spring 214 to urge the control pawl 230 into engagement with the teeth 156 of the ratchet wheel 154. The activation of the switch 214 can be accomplished when the occupant of the vehicle engages a tongue (not shown) in the buckle. It should be appreciated that as the occupant inserts the tongue into the buckle 246, a significant amount of webbing will have been removed from the retractor and as such, the spring 214 is permitting to urge the locking pawl 230 into its engaged position as shown in FIG. 6. As an alternative to using the solenoid 242 the locking pawl 230 can also be moved by a cable 243 (also shown is phantom line in FIG. 6) connected to a plunger 245 mounted in a door support structure whereby the plunger travels upon the opening of the door to move the locking pawl.

Reference is again made to FIGS. 5 and 6. The post or arbor 126 shown therein is of general cylindrical shape. As the outer tube 112 rotates with the spool 70b, the spring 158 is wound about the sides 250 of the post or arbor 126. Further as can be seen from FIGS. 5 and 6, the arbor rotates coaxially relative to the center of the control ratchet wheel 154.

Figure 9:
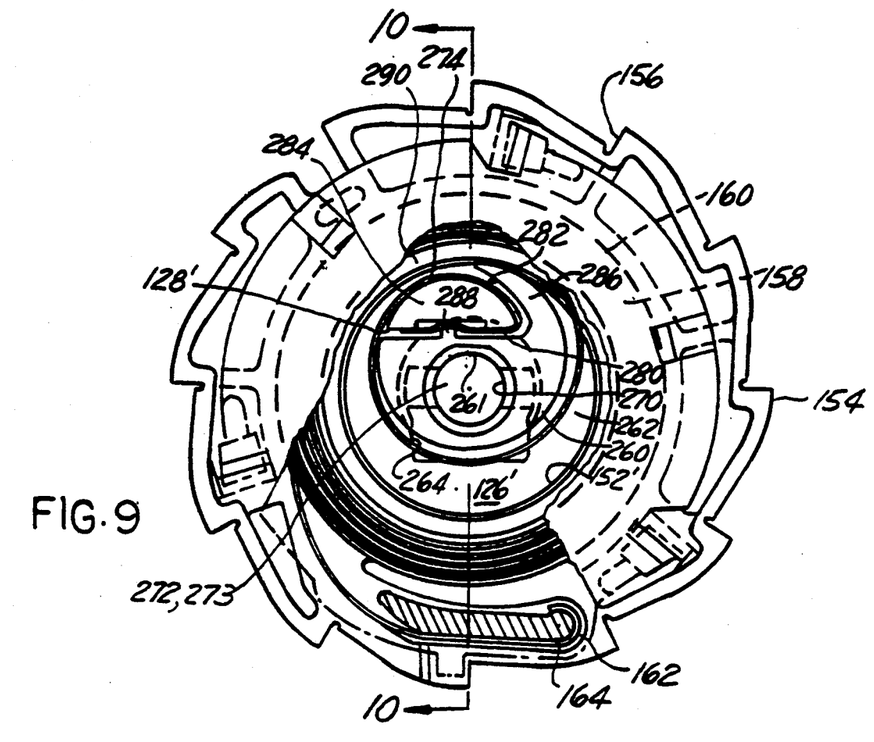
FIG. 9 illustrates a plan view of a control ratchet wheel.
Figure 10:
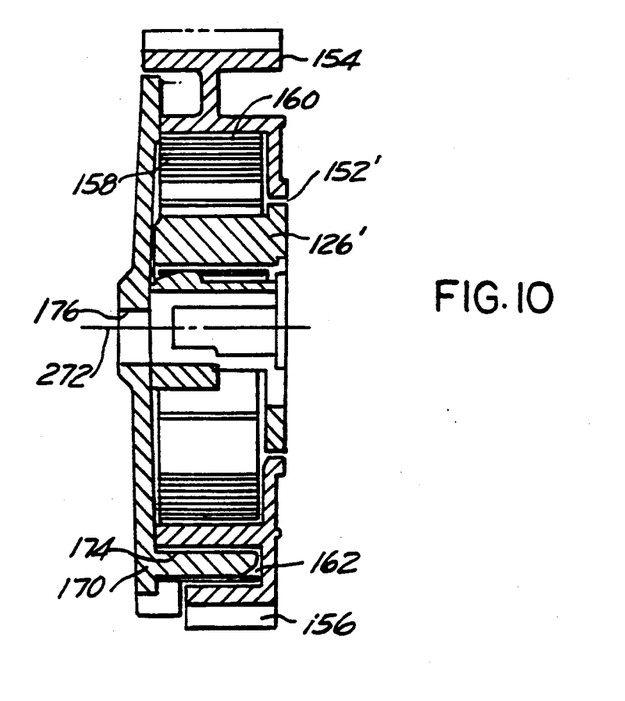
FIG. 10 illustrates a cross-sectional view taken through section lines 10—10 of FIG. 9.

Reference is made to FIGS. 9 and 10 which illustrate an alternate embodiment of the invention. It can be appreciated that the control ratchet wheel 154 is essentially identical to the control ratchet wheel illustrated in the earlier figures. This is also true of spring 158 and cover 170 that fit into the control ratchet wheel 154. The difference between the mechanism illustrated in FIGS. 9 and 10 and that illustrated in FIGS. 5 and 6 resides with the construction of the post or arbor 126'.

Figure 11:
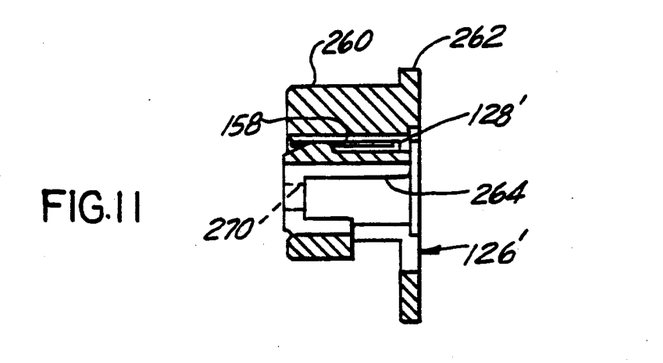
FIG. 11 illustrates a cross-sectional view of a post or arbor, also shown in FIGS. 9 and 10.

The arbor 126' comprises a generally cylindrical body 260 which is offset relative to a plate portion 262. The interior walls of the body 260 define a cavity or slot 264 into which is received end 124 of the outer tube 112. The end 224 is received within the slot 264 such that the arbor 126' is movable with the outer tube 112 as was arbor 126. The inner tube 130 extends through an opening 270 in the body 260. As can be appreciated, the center of the opening 270 is coaxial with the center line 272 of the control ratchet wheel 154 which also corresponds to the center 273 of tube 112. The plate 262 is received within an enlarged opening 152' in one side of the ratchet wheel 154. The arbor 126' includes a slot 128' extending therethrough to receive the inner end 274 of the spring 158. The slot 128' includes an axial portion 280 and an arcuate portion 282. As can also be seen from FIG. 9, the arbor 126' includes a post portion 284 and an arcuately shaped portion 286. Positioned within the slot is a tab 288 which is useful in securing the spring 158 relative to the post portion 284. Reference is briefly made to the cross-sectional view shown in FIG. 11. While this figure illustrates an isolated cross-sectional view of the arbor 126', the end of the spring 158 is shown within the slot 128' for reference purposes.

Figure 12:
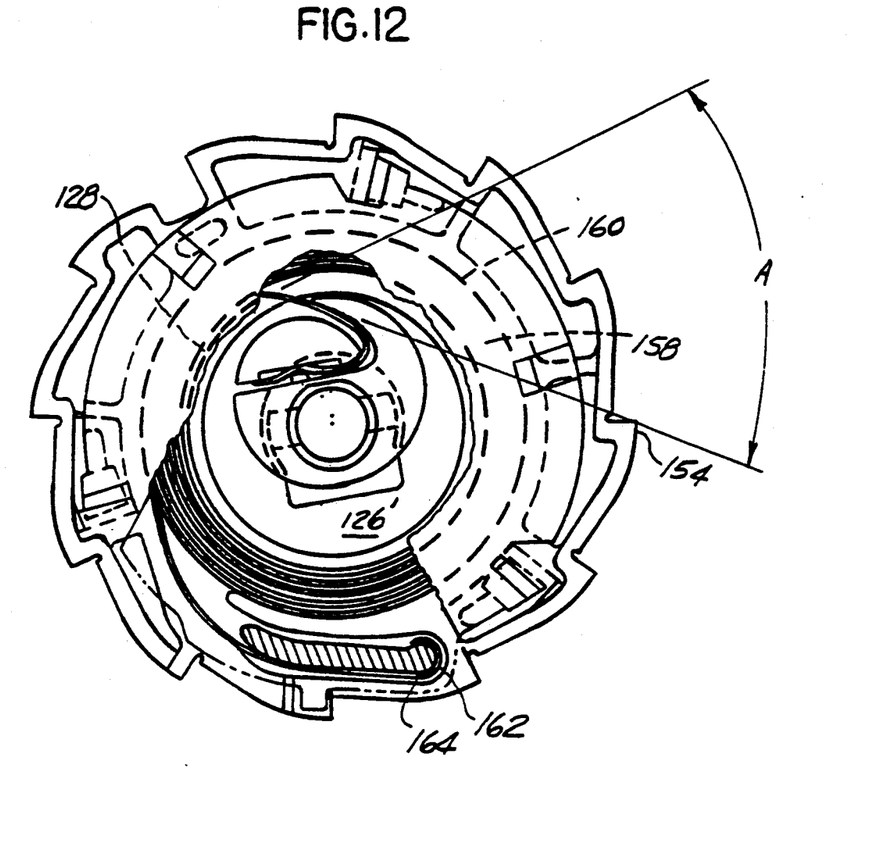
FIG. 12 illustrates another cross-sectional view of the mechanism shown in FIG. 9.

Reference is again made to FIG. 9. FIG. 9 illustrates the relationship of the various components with the spring 158 in a relaxed condition. Numeral 261 points to the center of the element 260. As mentioned above, the cylindrical element 260 is eccentrically positioned relative to the axis 272 of the control ratchet wheel 154. As can be appreciated, as the arbor 126' rotates with the outer tube or alternatively, as the control ratchet wheel 154 rotates with the inner tube 130, the arbor 126' and ratchet wheel 154 will rotate relative to one another. As a result of this relative rotation, the cylindrical element 260 will rotate and orbit relative to the spring 158 due to the eccentric positioning of the cylindrical element 260. As the arbor 126' rotates, the coil will envelope the outer walls of element 260. As can be seen in FIG. 9, there exists a relatively circular space 290 defined by the inner turns of the coil with the coil in its relaxed position. It can also be seen that the spacing between the element 260 and particularly its arcuately shaped portion 286, is more closely spaced relative to the coil than is arbor 126 shown in FIG. 6. Reference is briefly made to FIG. 12. FIG. 12 also illustrates the spring 158 in its relaxed position. However, when the webbing is rewound under the action of the high torque spring 140, the arbor 126' may come to rest at a slightly over-travelled position as illustrated. It can be appreciated that a point of weakness in the spring might exist at the point where the spring exits the arbor. Over time, the continued over-travelling of the arbor 126' might cause the spring to fatigue at this location. This problem however is circumvented by the utilization of the arcuate slot 128', the post portion 284 and the arcuate portion 286 of the element 260. With the arbor 126' in its over-travelled position, the inner end 274 of the spring is urged outwardly against the next innermost coil of the spring 158. In this orientation, there is no bending of the spring 158 as it exits the arcuate portion 282 of the slot 128'. As can be appreciated, in this orientation the end of the spring exiting the arbor 126' is maintained in a compressed state. In the embodiment illustrated in FIG. 12, the exit angle of the arcuate portion 286 of element 282 is approximately 44 degrees. As can be seen in FIG. 12, this angle is measured between the tangent to the inner portion of the coil and the inner edge of the portion 286.

Many changes and modifications in the above described embodiment of the invention can, of course, be carried out without departing from the scope thereof. Accordingly, that scope is intended to be limited only by the scope of the appended claims.

We claim:

1. A dual tension safety belt retracting device comprising:
 a frame (26), a spool (70b) rotatably mounted on the frame (26), for storing safety belt webbing (84) including first and second ratchet wheels (74b, 76b);
 an outer tube (112), extending through and connecting the first and second ratchet wheels;
 an inner shaft (130) extending through and rotatably disposed in the outer tube (112);
 a main, high torque (140) rewind spring to apply a rewind bias to the inner shaft (130);
 a low torque, rewind spring (158), connecting the outer tube (112) to a control ratchet wheel (154), is connected to one end of the inner shaft (130) opposite the main rewind spring (140);
 control pawl means (200) for engaging the control ratchet wheel (154), rotatably movable between a first position disengaged from the control ratchet wheel (154) and a second position in engagement with the control ratchet wheel (154) wherein when the control pawl means is in its second position it is effective to block out the main rewind spring from exerting a bias on the safety belt webbing, and
 moving means (224) for causing the control pawl means (200) to move between the first and second positions.

2. The device as defined in claim 1 wherein the moving means includes webbing engaging means for causing the pawl to move in response to the amount of webbing on a designated spool.

3. The device as defined in claim 1 wherein the moving means includes means for applying a force directly to the control pawl means to move same.

4. The device as defined in claim 1 wherein the moving means includes a solenoid linked to the control pawl means activated by a signal for causing the control pawl means to move.

5. The device as defined in claim 1 wherein the frame supports a second spool (70a) for storing belt webbing (82) and wherein the webbing engaging means (224) senses the amount of belt webbing on a second spool (70a) thereby moving the control pawl means between the first and second positions.

6. The device as defined in claim 1 wherein the control ratchet wheel (154) includes a cavity (160) into which is received the low torque spring (158) formed as a coil, one end of the low torque spring (158) being secured to the control ratchet wheel (154), the other end (274) of the low torque spring (158) connected to a post or arbor (126, 126') rotatable in the control ratchet wheel and positioned inside the low torque spring, the post or arbor (126, 126') connected to an end (116, 122) of the outer tube (112) and rotatable with the outer tube (112).

7. The device as defined in claim 6 wherein the arbor (126) comprises a generally cylindrical element, generally coaxially located to the center of the control ratchet wheel (154), having a central opening through which the inner shaft rotatably extends, the element including a slot (128) for receiving the other end of the low torque spring (158) and a cavity to receive the end of the outer tube (130).

8. The device as defined in claim 6 wherein the arbor (126') includes a generally cylindrical element (260) having an opening (270) through which the inner shaft (130) extends, the opening (270) coaxial to the center of the control ratchet wheel (154) and eccentrically positioned relative to the center of the element (260) such that the element (260) is eccentrically positioned within an inner space (290) defined by the coiled low torque spring (158), the element (260).

9. The device as defined in claim 8 wherein the element (260) includes a slot (128') having an exit portion (282) extending outwardly through the element in opposition to the inward direction of curvative of the innermost first turn of the low torque spring (158).

10. The device as defined in claim 9 wherein the exit angle (A) of the exit portion of the slot (282), is such that the end of the low torque spring (158) exiting therefrom is maintained in compression thereby preventing the bending or kinking of such end by urging such end outwardly towards the next most outer loop of the low torque spring (158) when the coiled low torque spring is in its relaxed position and when torques acting on the element and the control ratchet wheel (154) tend to cause the element to rotate against the inward spiral direction of the coiled low torque spring (158).

11. The device as defined in claim 9 wherein the exit portion of the slot is arcuately shaped.

* * * * *